Jan. 12, 1960
A. KOEPPLIN
2,920,414
FISHING LINE CONTROLLERS
Filed Nov. 28, 1958
2 Sheets-Sheet 2
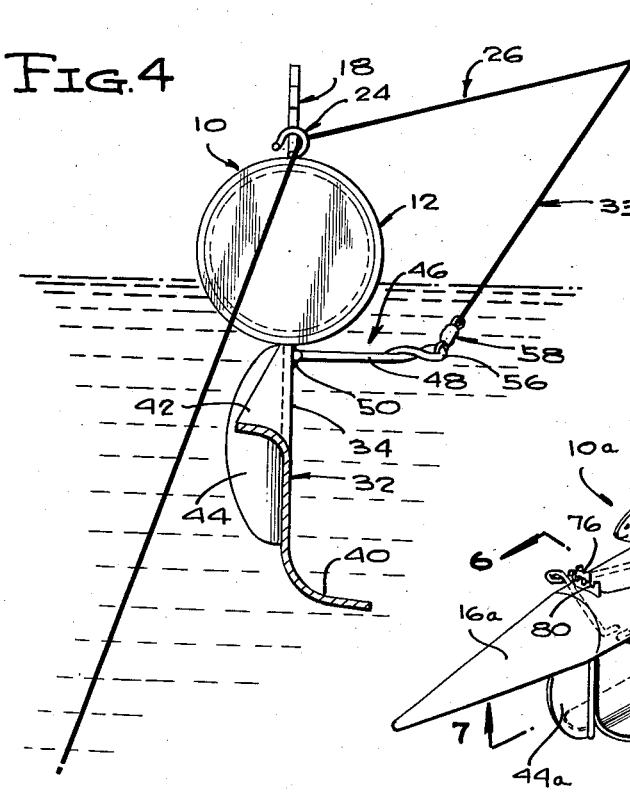
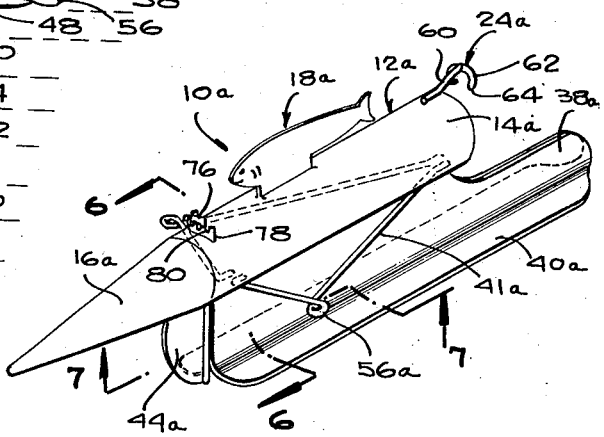
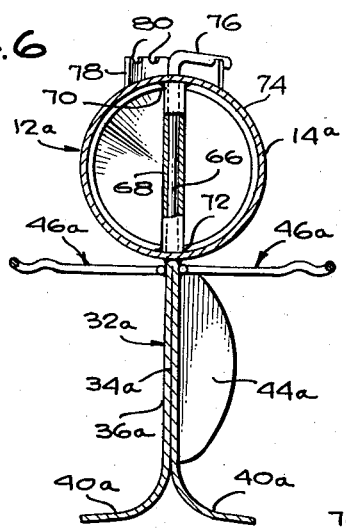
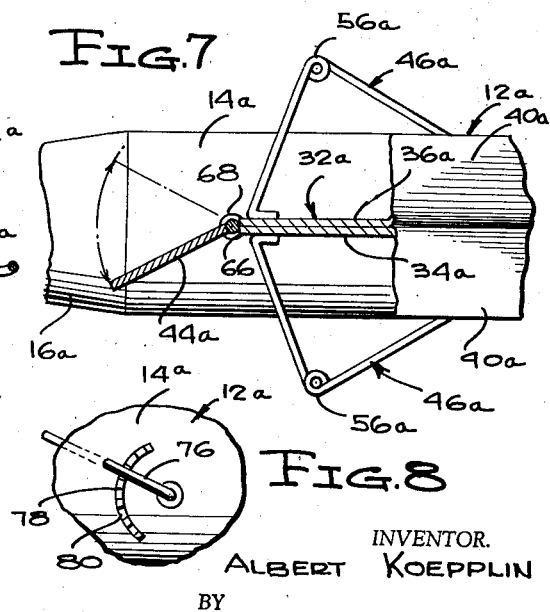
INVENTOR.
ALBERT KOEPPLIN
BY
McMorrow, Berman & Davidson
ATTORNEYS

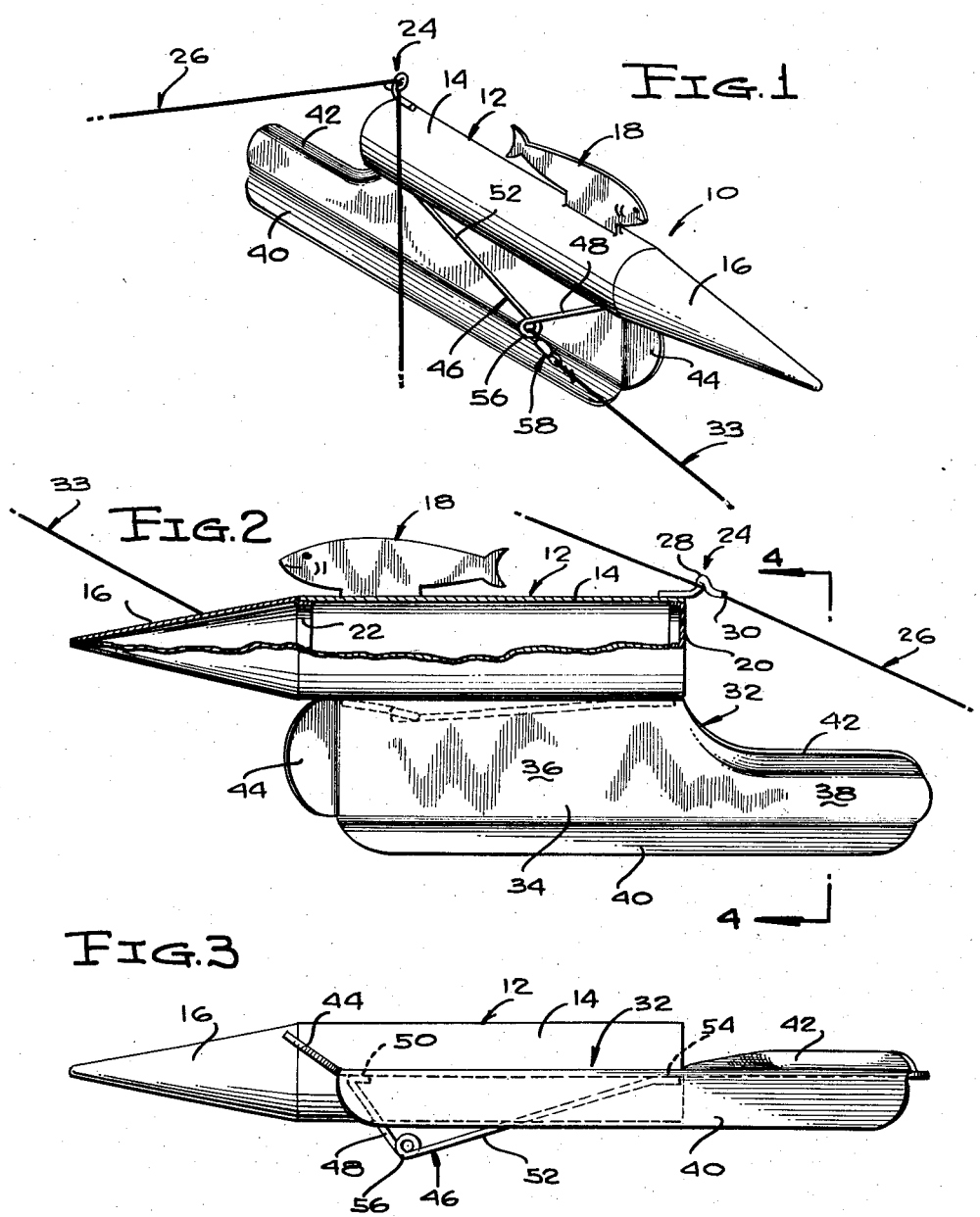

United States Patent Office 2,920,414
Patented Jan. 12, 1960

2,920,414

FISHING LINE CONTROLLERS

Albert Koepplin, Elgin, N. Dak.

Application November 28, 1958, Serial No. 776,776

14 Claims. (Cl. 43—43.13)

This invention relates to improvements in fishing line controllers for use in fishing at distances away from boats and shores, and more particularly to improved devices of this kind which are water surface-borne and either boat or shore tethered and have means for only releasably and temporarily securing fishing lines thereto only at points intermediate the lengths of the lines.

The primary object of the invention is to provide devices of the character indicated which enable fishing to be done from shore in waters which are either too rough, too cold, or too shallow for the use of a boat or to be entered by a fisherman, although the devices can also be successfully used when fishing from a boat or from shore under any conditions, and enabling fishing manipulations of a fishing line, including landing of fish, to be done in the usual way, upon disengaging the fishing line from releasable line engaging means on the devices.

Another object of the invention is to provide practical, efficient, and easily used and operated devices of the character indicated above, which can be made in fixed non-adjustable forms for either right-hand or left-hand operation, or in adjustable forms for both right-hand and left-hand operations, and have fishing line securing means from which fishing lines can be easily and quickly released by manipulations of the fishing lines whenever desired, so as to free the lines from the devices, and enable fishermen to then fish with the lines as in ordinary fishing, in any way desired, independently of the devices, while the devices remain tethered either to a boat or to a shore anchor.

A further object of the invention is to provide simple, compact, and relatively low cost devices of the character indicated above, which have marker means which are maintained above the surface of the water being fished, which are visible at all times, whereby the locations of the devices in the water are visible at all times to other boat-borne and shore-borne fishermen and other interested persons, so as to avoid interfering fishing operations, and loss of the devices in case of their breaking free of their tether lines.

Other important objects and advantageous features of the invention will be apparent from the following description and the accompanying drawings, wherein, for purposes of illustration only, a specific form of the invention is set forth in detail.

In the drawings:

Figure 1 is a front perspective view of a non-adjustable device of the invention, arranged for left-hand operation, showing tether and fishing lines associated therewith;

Figure 2 is an enlarged vertical longitudinal section taken through Figure 1;

Figure 3 is a bottom plan view of Figure 2;

Figure 4 is a further enlarged vertical transverse section taken on the line 4—4 of Figure 2;

Figure 5 is a perspective view of an adjustable device of the invention;

Figure 6 is an enlarged vertical transverse section taken on the line 6—6 of Figure 5, and showing the steering fin adjusted to the right-hand side of the device for right-hand travel of the device;

Figure 7 is an enlarged horizontal section taken on the line 7—7 of Figure 5; and Figure 8 is a fragmentary top plan view of Figure 6, showing the steering fin adjusting means.

Referring in detail to the drawings, wherein like and related numerals designated like parts throughout the several views, and first to Figures 1 to 4 thereof, the numeral 10 generally designates a non-adjustable device of the invention, which comprises a longitudinally elongated and normally horizontal float 12, having a preferably plain cylindrical main portion 14, and an elongated conical nose 16. The float 12 is preferably in the form of a hollow body, and is, in any case, of sufficient buoyancy to float at or near the surface of water in which it is used, so as to constantly retain a marker 18 above the water surface. The marker 18 is here shown as being mounted on and upstanding from the main float portion 14, and as being in the form of a flat longitudinal plate shaped to represent a fish.

The main portion 14 of the float 12, as shown in Figure 2, is composed of a hollow cylinder, of any suitable material, such as sheet metal or plastic, which is closed at its rear end by a flanged disc 20 which is securably inserted into the rear end; and the nose 16 is a hollow cone, of suitably similar material, having a reduced diameter annular portion 22 on its rear end, which is securably inserted into the open forward end of the main portion 14, so as to form a closed and sealed hollow body. The marker 18 is preferably located on the upper side of the main portion 14 near the forward end thereof.

Secured in suitable manner upon the upper side of the main portion 14, at and reaching rearwardly beyond the rear end thereof, is a fishing line engager 24, for temporarily and releasably engaging an intermediate part of a fishing line 26, as shown in Figure 1, at a selected and visible location between the fishing line float or hook assembly (not shown) and the associated fishing rod (not shown). The engager 24 is in the form of an open pig-tail having a three-quarter circular fishing line-engaging loop 28, and a free terminal 30 trailing the loop 28. In the case of a device 10 which is arranged for left-hand operation in the water, as shown in Figure 1, the terminal 30 is at the left-hand side of the loop 28, while for a right-hand operating device 10, the terminal 30 is located at the right-hand side of the loop 28 so that the pull of the fishing line 26 is on the closed side of the loop at the boat or shore side of the device 10.

It is to be noted that the engager 24 makes no binding grip on a fishing line 26, but instead leaves the fishing line free to be reeled in or let out at any time at the will of the fisherman. The fishing line 26 can be disengaged by a fisherman from the engager at any time, while the device 10 is in operation in the water, and at a location remote from a boat or the shore, by whipping or swinging the line relative to the device, so as to bring the fishing line around to the open side of the loop 28 and out of the loop, and enable ordinary fishing operations to be performed by the fisherman without hindrance from the device 10. When a fishing line is thus released from the device 10, the marker 18 continually shows the location of the device in the water, and the device remains tethered to the boat or to the shore by a tethering line 33, by means hereinafter described.

The device 10 further comprises a centerboard structure 32, which is here shown as being longitudinally elongated vertical flat plate 34, of uniform thickness, having a relatively wide main portion 36 of only slightly less length than and secured, in suitable manner, to and extending along the diametrical centerline of the bottom of the main portion 14 of the float 12, and a substantially narrower trailing or tail portion 38 which is downwardly displaced or offset with regard to the float portion 14.

The narrow trailing or tail portion 38 shares a common lower edge portion with the main portion 36 of the centerboard plate 34, and, as clearly shown in Figure 1, this lower edge portion is bent laterally outwardly to the right from the vertical plane of the plate 24, so as to define a relatively long and wide longitudinally elongated lower horizontal water-foil 40 having rounded ends and which is parallel to the float main portion 14, and extends for substantially the length of the centerboard plate 34. In a right-hand operating device 10, the long lower water-foil 40 would be directed to the left-hand side of the device, instead of to the right-hand side thereof. A relatively narrow and short upper water-foil 42 is formed by binding the upper edge portion of the tail portion 38 of the centerboard plate 34 laterally outwardly of the plane of the plate 34 to the side thereof remote from the wider and longer lower water-foil 40.

On the forward end of the centerboard plate 34 is a substantially semi-circular, forwardly projecting steering fin 44, which, in the case of the left-hand operating device 10, as shown in Figure 1, is bent out of the plane of the plate 34, toward the left, at an angle of about twenty degrees. In the case of a right-hand operating device, the steering fin 44 is bent, instead, toward the right. Obviously, upon being moved forwardly in water, or in being held stationary relative to rearwardly moving water, the fin 44 steers the device 10 toward the left at an angle away from a boat or shore, to which the device is tethered, so that the steered movement of the device is, as desired, effective to travel the device away from a boat or shore and maintain maximum distance away from boat or shore, without manipulation or control by a fisherman, other than determining the length of the tethering line 32. The action of the longer and wider lower water-foil 40 is to cooperate with the centerboard plate 34 in stabilizing the device 10 in the water and preventing undue sidewise motions and upward planing of the nose 16 in swift-running or rough water, and the function of the shorter narrower upper water-foil 42 is to cooperate with the centerboard plate 34 and to act upon the water at a point behind the float 12 to limit or prevent nose-diving of the device in the water. As shown in Figure 4, the water-foils are slightly curved where they leave the centerboard plate 34.

For securing the tethering line 33 to a boat or to a suitable anchor on a shore, a preferably elongated hollow V-shaped, preferably wire tether 46 is provided, which preferably extends the length of one side of the centerboard plate 34 and is secured thereto immediately beneath the main float portion 14. The tether 46 has a relatively short forward arm 48 which is fixed, in suitable manner, as indicated at 50, at its forward end to the same side of the centerboard plate 34 as the long water-foil 40 at the forward end of the plate 34; and a relatively long rear arm 52 which is suitably secured, as indicated at 54, to the same side of the main centerboard portion 36 at the rear end thereof. The forward and rear arms 48 and 52 are joined at their meeting ends by a closed loop or eye 56, in which the related end of the tethering line 33 is suitably secured, as by means of a swivel 58, as shown in Figure 1. As indicated in phantom lines in Figure 2, the tether arms 48 and 52, while being located generally in the same horizontal plane parallel to the float 12, have slight laterally outward and downward inclinations toward the eye 56. Because of the location of the tether 46 in a horizontal plane close to the underside of the float 12 and at the upper edge of the centerboard structure 32 and because of the outriding location of the eye 56, the pull or restraint exercised by a tethering line 33 is imposed on the device at the point least likely to produce unwanted lateral rolling of the device in the direction of a boat or shore and rolling in the opposite direction is resisted by the pull of the tethering line 33.

The adjustable form of device for either left-hand or right-hand operation in water, shown in Figures 5 to 8, and generally designated 10a has a float 12a similar to the float 12 of Figures 1 to 4, with a marker 18a on the top of the float and displaced rearwardly somewhat from the position of the marker 18. The fishing line engager 24a, instead of being a pig-tail loop, comprises a stem 60 secured upon the top of the main float portion 14a and extending above and rearwardly therebeyond and terminating in a downwardly facing arcuate half-loop 62, which has inwardly curved horns 64 which extend equally beyond opposite sides of the stem 60, so that a fishing line engaged in the half-loop 62 can be disengaged from the half-loop from either side thereof by manipulation of the fishing line.

The centerboard structure 32a is generally similar to that of Figures 1 to 4, but its centerboard plate 34a, is either dual, as shown in Figures 6 and 7, or is otherwise formed, so as to provide for the support of two similar long lower water-foils 40a, similar in shape and extent to the single water-foil 40. The upper edge of the tail portion 38a of the plate 34a is devoid of an upper water-foil 42.

A steering fin 44a, similar to the steering fin 44 of Figures 1 to 4, is fixed on the lower part of a vertical axle or pin 66 whose upper part is supportably journaled through a vertical tube 68 which extends between and is suitably secured, as indicated at 70 and 72 at its ends to top and bottom portions of the side wall 74 of the main float portion 14a near the forward end thereof. The pin 66 has a lateral detent arm 76 on its upper end above the float portion 14a. A forwardly facing arcuate detent rib 78 is fixed on the top of the float portion 14a behind and concentric with the pin 66, and has spaced along its upper edge a series of detent notches 80, into which the free end of the detent arm 76 is selectively engageable to determine and hold the steering fin 44a in selected angular positions to either side of the centerboard structure 32a, so as to adjust the device 10a for left-hand or right-hand operation in the water, at desired angles of deviation from a straight forward course. Retention of the detent arm 76 in detent notches 80 can be assured either by making the arm 76 sufficiently resilient to provide for its being strained upwardly to clear the upper edge of the rib 78 between notches before snapping into a selected notch; or by having the detent arm 76 rigid and providing sufficient clearance between the steering fin 44a and the underside of the float portion 14a to provide for the slight elevation of the pin 66 needed to enable the detent arm to ride the upper edge of the rib 78 between notches 80. In the latter case the clearance mentioned would be held to that sufficient only to permit the described adjustment of the rigid arm 76 to different notches 80 under some stress and friction between it and the upper edge of the rib, and insufficient to incur displacement of the steering fin 44a out of adjusted positions under expected operating conditions in the water.

Although there have been shown and described herein preferred forms of the invention, it is to be understood that the invention is not necessarily confined thereto, and that any change or changes in the structures of and in the relative arrangements of components thereof are contemplated as being within the scope of the invention as defined by the claims appended hereto.

What is claimed is:

1. A fishing line controller comprising a longitudinally elongated float having a main portion having forward and rear ends and a tapered nose extending forwardly from the main portion, a centerboard structure having a main portion fixed to and depending from the underside of said main portion of the float and a tail portion extending rearwardly beyond the rear end of said main portion, a releasable fishing line engager fixed on the upper side of the float main portion at the rear end thereof, said engager being capable of connecting the controller to an intermediate portion of a fishing line while leaving the line free to move lengthwise relative to the engager and the controller, relatively long and relatively wide water-foil means on and projecting laterally from the lower edge of and extending along the centerboard structure, laterally angled steering fin means on the forward end of the centerboard structure, and tethering line tether means fixed to and extending laterally from said centerboard structure at a point near the underside of the main portion of the float.

2. A fishing line controller according to claim 1, wherein an upper relatively short and narrow water-foil is fixed on and extends along the upper edge of said tail portion of the centerboard structure and extends laterally outwardly from the side of the centerboard structure remote from said long and wide water-foil means.

3. A fishing line controller according to claim 1, wherein an upper relatively short and narrow water-foil is fixed on and extends along the upper edge of said tail portion of the centerboard structure and extends laterally outwardly from the side of the centerboard structure remote from said long and wide water-foil means, and wherein said long and wide water-foil means is a single lower water-foil member.

4. A fishing line controller according to claim 1, wherein said float is sufficiently buoyant to maintain a position at the surface of the water, and said main portion of the float has fixed thereon an upstanding marker constantly visible above the surface of the water.

5. A fishing line controller according to claim 1, wherein said steering fin means is a single fin fixed on the forward end of the main portion of the centerboard structure.

6. A fishing line controller according to claim 1, wherein said steering fin means is a single fin fixed on the forward end of the main portion of the centerboard structure, and said centerboard structure comprises a single vertically disposed plate.

7. A fishing line controller according to claim 1, wherein said fishing line engager comprises a pig-tail having a three-quarter circular loop having an opening facing the side of the float remote from the location of said water-foil means.

8. A fishing line controller according to claim 1, wherein said tether means comprises a longitudinally elongated horizontal V-shaped member having a forward arm secured at its forward end to the centerboard structure at the forward end thereof and a rear arm secured at its rear end to the rear end of the main portion of the centerboard structure, and a tethering line connecting eye joining the other ends of the arms.

9. A fishing line controller according to claim 1, wherein said fishing line engager comprises a stem fixed to the main portion of the float and projecting rearwardly relative thereof, said stem terminating at its rear end in a downwardly facing half-loop having laterally inwardly and oppositely curved horns at opposite sides of the stem.

10. A fishing line controller according to claim 1, wherein said water-foil means comprises two similar lower water-foils on and projecting from opposite sides of the centerboard structure.

11. A fishing line controller according to claim 1, wherein said water-foil means comprises two similar lower water-foils on and projecting from opposite sides of the centerboard structure, and said tether means comprises similar tethers on opposite sides of the main portion of the centerboard structure.

12. A fishing line controller according to claim 1, wherein said water-foil means comprises two similar lower water-foils on and projecting from opposite sides of the centerboard structure, and said tether means comprises similar tethers on opposite sides of the main portion of the centerboard structure, each comprising a longitudinally elongated horizontal V-shaped member having a forward arm secured at its forward end to the centerboard structure and a rear arm secured at its rear end to the centerboard structure, and a tethering line connecting eye joining the other ends of the arms.

13. A fishing line controller according to claim 1, wherein said steering fin has a free forward end and a rear end, a vertical pin having a lower part fixed on the rear end of the fin and an upper part rising through a forward part of the main float portion, a vertical tube secured within the main float portion through which the upper part of the pin is journaled, a lateral detent arm on the upper end of said pin above the main float portion, and detent means fixed on the top of the main float portion, with which said lateral detent arm is adjustably engaged.

14. A fishing line controller according to claim 1, wherein said steering fin has a free forward end and a rear end, a vertical pin having a lower part fixed on the rear end of the fin and an upper part rising through a forward part of the main float portion, a vertical tube secured within the main float portion through which the upper part of the pin is journaled, a lateral detent arm on the upper end of said pin above the main float portion, and detent means fixed on the top of the main float portion, with which said lateral detent arm is adjustably engaged, said detent means comprising an arcuate ridge rising from the main float portion and having an upper edge provided with spaced notches in which said detent arm is selectively engageable so as to hold said steering fin in adjusted angular positions to either side of the centerboard structure.

References Cited in the file of this patent

UNITED STATES PATENTS

| | | |
|---|---|---|
| 239,926 | Bray | Apr. 12, 1881 |
| 780,029 | Flegle | Jan. 17, 1905 |
| 2,587,190 | Merriweather | Feb. 26, 1952 |
| 2,597,288 | Caldwell | May 20, 1952 |